US008780881B2

(12) United States Patent
Venkatachalam et al.

(10) Patent No.: US 8,780,881 B2
(45) Date of Patent: Jul. 15, 2014

(54) ADAPTIVE POLLING FOR BURSTY WIRELESS DATA TRAFFIC

(75) Inventors: Muthaiah Venkatachalam, Beaverton, OR (US); Chun Nie, Hillsboro, OR (US); Xiangying Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 725 days.

(21) Appl. No.: 11/644,469

(22) Filed: Dec. 21, 2006

(65) Prior Publication Data

US 2008/0151789 A1 Jun. 26, 2008

(51) Int. Cl.
*H04J 3/16* (2006.01)

(52) U.S. Cl.
USPC .......................................................... 370/346

(58) Field of Classification Search
USPC .......................................................... 370/346
See application file for complete search history.

(56) References Cited

U.S. PATENT DOCUMENTS

| | | | | |
|---|---|---|---|---|
| 6,173,323 | B1 * | 1/2001 | Moghe | 709/224 |
| 6,567,386 | B1 * | 5/2003 | Sugaya et al. | 370/322 |
| 6,707,808 | B1 * | 3/2004 | Vedrine | 370/337 |
| 6,829,227 | B1 * | 12/2004 | Pitt et al. | 370/329 |
| 6,990,086 | B1 * | 1/2006 | Holur et al. | 370/329 |
| 7,508,762 | B2 | 3/2009 | Ohtani | |
| 7,656,853 | B2 | 2/2010 | Albulet | |
| 7,751,437 | B2 | 7/2010 | Spinar et al. | |
| 2002/0167961 | A1 * | 11/2002 | Haartsen | 370/444 |
| 2004/0156350 | A1 * | 8/2004 | Brasic et al. | 370/346 |
| 2006/0057968 | A1 * | 3/2006 | Ohtani | 455/67.16 |
| 2006/0140166 | A1 * | 6/2006 | Albulet | 370/346 |
| 2006/0146863 | A1 * | 7/2006 | Spinar et al. | 370/449 |

OTHER PUBLICATIONS

International Preliminary Report on Patentability and Written Opinion dated May 27, 2008, issued in PCT/US2007/087818 (5 pgs).
Office Action dated May 3, 2012 issued by the Korean Intellectual Patent Office in Application No. 10-2012-7006426 (English translation), (3 pgs).
Notification of Patent Grant dated Mar. 2, 2012 by the Chinese Patent Office in Application No. 200780047620.9 (English translation), (7 pgs.).
Supplemental Search Report dated Mar. 3, 2012 for European Patent Application No. 07869387.6 (9 pgs).
Christensen, C. W. et al., "Adaptive Polling," IP.com Journal, Dec. 1, 1976 (5 pgs.).
Das, et al., "Enhancing Performance of Asynchronous Data Traffic over the Bluetooth Wireless Ad-Hoc Network," Proceedings IEEE Infocom 2001, Conference on Computer Communications (8 pgs).
Lee, I.G., et al., "Efficient block size based polling Scheme for IEEE 802.11e Wireless LANs," 2005 IEEE 61st Vehicular Technology Conference, (5 pgs).
Nie, C., et al., "Adaptive Polling Service for Next-Generation IEEE 802.16 WiMAX Networks," Global Communications Conference 2007, (3 pgs.).

* cited by examiner

*Primary Examiner* — German J Viana Di Prisco
(74) *Attorney, Agent, or Firm* — Trop, Pruner & Hu, P.C.

(57) ABSTRACT

Various embodiments of the invention may use adaptive polling in a wireless network when one or more consecutive polls show that the polled station has no data to transmit. When triggered to perform adaptive polling, a base station may wait for increasingly long intervals between polls to a particular subscriber station, until some maximum interval has been reached. In some embodiments, the intervals may increase exponentially.

17 Claims, 3 Drawing Sheets

Adaptive polling: Tmin = 20 ms, Tmax = 1280 ms, N=4

| BS Poll | SS Has Data to send? | Interval to next poll |
| --- | --- | --- |
| 1 | Yes | 20 ms |
| 2 | Yes | 20 ms |
| 3 | Yes | 20 ms |
| 4 | No | 20 ms |
| 5 | No | 20 ms |
| 6 | No | 20 ms |
| 7 | No | 20 ms |
| 8 | No | 40 ms |
| 9 | No | 80 ms |
| 10 | No | 160 ms |
| 11 | No | 320 ms |
| 12 | No | 640 ms |
| 13 | No | 1280 ms |
| 14 | No | 1280 ms |
| 15 | No | 1280 ms |
| 16 | Yes | 20 ms |
| 17 | No | 20 ms |
| 18 | Yes | 20 ms |

FIG. 2

ADAPTIVE POLLING FOR BURSTY WIRELESS DATA TRAFFIC

BACKGROUND

In various types of wireless networks, a base station (BS) may poll the subscriber stations (SS) in the network to determine if they have data to transmit to the BS. If an SS is transmitting real-time data to the BS, it must be polled frequently to avoid disrupting the real-time flow of that data. However, if the SS does not thing to transmit, repeated frequent polling of that SS (as well as frequent polling her SS's in the network) can use up a lot of network bandwidth in unproductive polling. In bursty traffic environments, where a particular SS may go for long periods with to send, this unproductive polling can use up significant network bandwidth.

BRIEF DESCRIPTION OF THE DRAWINGS

Some embodiments of the invention may be understood by referring to the following description and accompanying drawings that are used to illustrate embodiments of the invention. In the drawings:

FIG. 2 shows a chart of polling intervals that change based on the responses received from the polled subscriber station, according to an embodiment of the invention.

DETAILED DESCRIPTION

Figure 1:
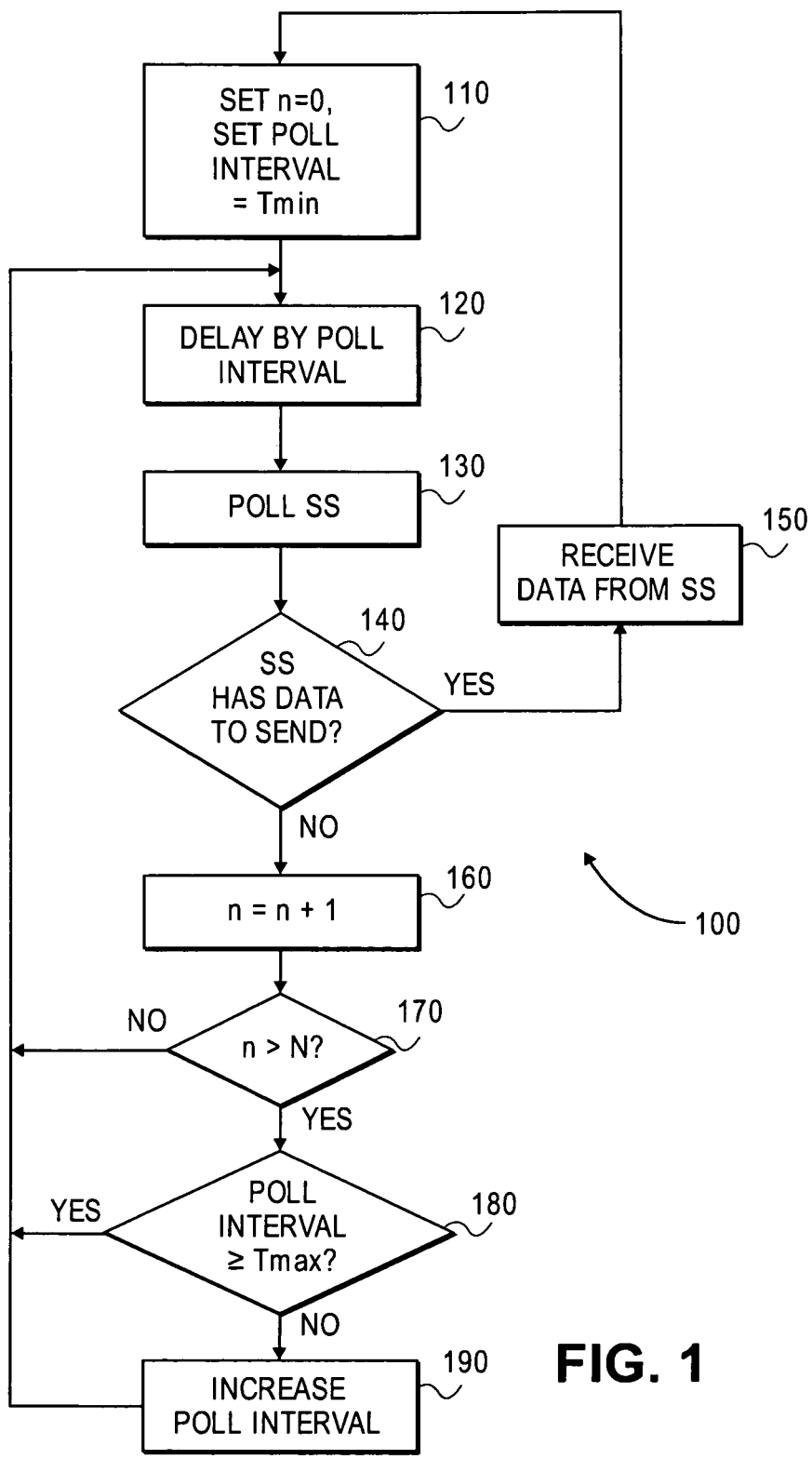
FIG. 1 shows a flow diagram of a method of adaptive polling, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "base station" is used herein to describe a node in a wireless network that performs overall control of communications within the network. The term "subscriber stations" is used to describe the nodes whose communication in the network is controlled by the base station. These terms are for convenience only—other terms, such as "access point", "mobile stations", etc. may be used by others to describe the same devices.

In a wireless network, a base station (BS) may periodically poll each subscriber station (SS) in the network, asking the polled SS if it has any data to send to the BS. If the SS has data to send, in some embodiments the SS may respond to the poll by transmitting the data to the BS. In other embodiments, the SS may request a block of time or other bandwidth allocation, during which it may transmit the data to the BS. On the other hand, if the polled SS has no data to transmit to the BS, the SS may indicate such in a brief reply that contains no such data, or may implicitly indicate such by not responding at all. Any feasible format may be used for the poll and for the responses. Although a BS may typically poll numerous SS's in the network, the description contained herein focuses on the polls directed from the BS to a single SS. Any other polls to other SS's are ignored in this description Similarly, this description does not cover the protocols used to transfer data, but covers only the polls and the whether the polled SS responds that it has data to send. The response itself, indicating whether there is data to transmit, is not considered 'data' as that term is used herein, although it may be considered data in other documents.

Various embodiments of the invention may use adaptive polling in a wireless network when one or more polls show that the polled station has no data to transmit. When triggered to perform adaptive polling, the base station may wait for increasingly long intervals between polls. In some embodiments, the intervals may increase linearly, exponentially, or in any other feasible manner. In some embodiments, the polling intervals may be constrained to be no less than some defined minimum value and no greater than some defined maximum value.

FIG. 1 shows a flow diagram of a method of adaptive polling, according to an embodiment of the invention. This process may be used in a base station to monitor the recent polling history for a particular subscriber station, and determine how that history affects the polling interval (i.e., the duration of time between polls) to that subscriber station. In this flow diagram, the value N is used to indicate how many consecutive polls to a particular SS, each poll producing a response that the SS has no data to transmit, should occur before triggering an increase in the polling interval. The counter value n is used to count the number of such consecutive polls that actually produced the 'no data' response. The value Tmin is used here to indicate the polling interval that is typically used when the SS responds that it has data to send. Another value labeled as Tmax is used here to indicate the longest polling interval that is used when the polling interval is being increased. Although the terms Tmin and Tmax may imply that they are the minimum and maximum values for polling intervals, this assumption may only be true within the narrow scope of this description. Other polling intervals for the same SS, affected by other factors, may fall outside this range of values. The values of Tmax, Tmin, and N may be determined in various ways. For example, in some embodiments the SS and BS may negotiate these values when the SS is being admitted to the network. In other embodiments, the SS may simply present its required values before being admitted to the network. In still other embodiments, these values may change dynamically from time to time based on network traffic levels, the type of data being transmitted in the network or by the individual SS, etc.

In the illustrated flow chart 100, the polling process may be initialized at 110 by setting the counter value n to 0 and setting the polling interval to Tmin. This value may represent the current polling interval, as implemented at 120. After the polling interval expires, the BS may poll the SS at 130. This poll may take any feasible form. For example, in some embodiments a standalone poll may be transmitted to the SS, and the SS may respond in the manner indicated by the conventions used in the network. In another example, a single transmission from the BS may allocate specific time slots for each of multiple SS's to response, and this particular SS may respond at its allocated time.

If the response from the polled SS indicates the SS has data to transmit, as determined at 140, the BS may receive that data from the SS at 150, and begin the process again at 110 by re-initializing and waiting for another interval of Tmin before polling the SS again. However, if the response from the polled SS indicates the SS has no data to transmit, or if the SS implies it has no data to send by not responding, the counter value n may be incremented at 160. If n has not increased beyond N, as determined at 170, then the loop 120-130-140-160-170 may be repeated until a poll response indicates the SS has data to transmit, or until n exceeds N, whichever comes first.

When n finally exceeds N, as determined at 170, the current duration of the polling interval may be checked at 180 to see if it has already reached Tmax. If it has, the BS may wait for the time period Tmax at 120 before polling the SS again at 130, and the polling interval may remain at Tmax until the polled SS eventually responds that it has data to send. But if the polling interval has not reached Tmax, as determined at 180, the polling interval may be increased at 190. The amount of the increase may be determined in various ways. In some embodiments, the increase may be linear—i.e., it may increase by a fixed amount each time. In other embodiments, the increase may be exponential—i.e., it may increase by powers of a particular base number. The example shown in FIG. 2 shows it increasing exponentially by powers of 2, i.e., doubling in value each time. Other embodiments may use other factors to determine how much the increase will be.

It should be noted that even though particular sequences have been illustrated, other factors may reset, interrupt, or alter these sequences in ways not shown. For instance, 1) some conditions may cause the re-initialization at 110 to occur regardless of the recent history of responses, 2) changes in network conditions may cause the values of any or all of Tmin, Tmax, and N to be modified, 3) piggyback or bandwidth stealing functions may be inserted and utilized during the course of adaptive polling in case the allocated bandwidth is not sufficient for the SS data transmission, so as to improve the bandwidth request efficiency, 4) etc.

FIG. 2 shows a chart of polling intervals that change based on the responses received from the polled subscriber station, according to an embodiment of the invention. A series of 18 consecutive polls are listed in the first column, numbered 1 through 18. Following each poll, a 'yes' in the second column indicates that the polled SS responded that it had data to send, while a 'no' indicates the polled SS responded that it did not have data to send. The third column shows the timing interval that the BS will wait before the next poll of that SS. In this example, Tmin is assumed to be 20 milliseconds (ms), Tmax is assumed to be 1280 ms, and N is assumed to be 4, but other embodiments may use other values for any or all of these parameters.

In the example of FIG. 2, the SS responds to the first three polls that it has data to send. For the next four polls, the SS responds that it has no data to send, and the value of n will be incremented after each of those four polls until n reaches a value of N (4). Thereafter, each poll for which the SS responds it has no data to send will result in the polling interval being doubled. This doubling continues until the polling interval reaches Tmax (1280 ms), at which point the polling interval remains at Tmax as long as the SS responds to each poll that it has no data to send. However, once the SS responds that it has data to send (e.g., after poll 16), the polling interval is reset to Tmin, and the entire process may be repeated from an initialized state. Note that no increase occurs after poll 17, even though the SS has no data to send, because N consecutive polls with a 'no data' response have not occurred. Also note that although decision block 180 of FIG. 2 bases its decision on the value of the polling interval, the same results may be achieved by counting the number of times the polling interval has been increased since it was at Tmin.

Figure 3:
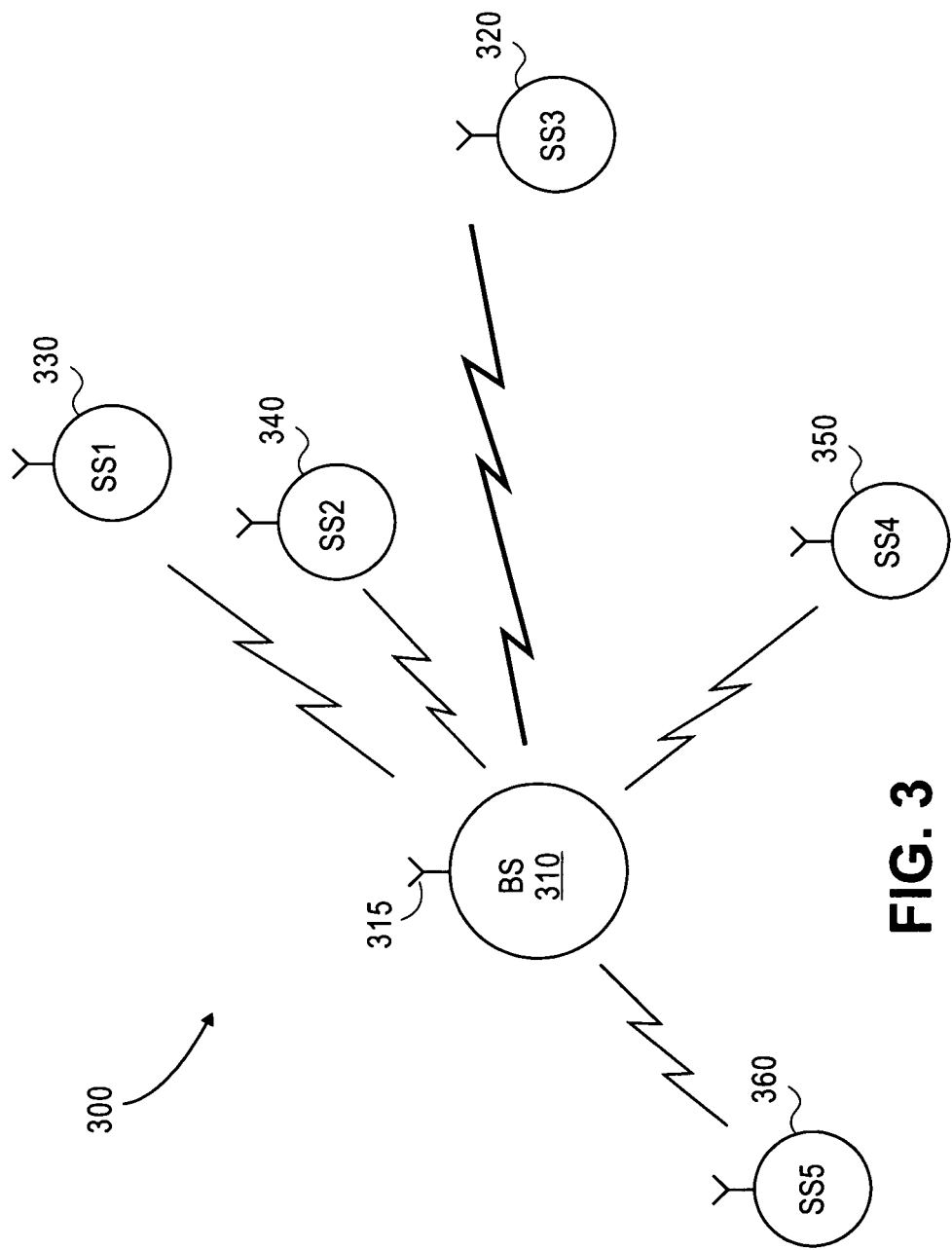
FIG. 3 shows a network, according to an embodiment of the invention.

FIG. 3 shows a network, according to an embodiment of the invention. In the illustrated network 300, a base station 310 may communicate wirelessly with several subscriber stations 320, 330, 340, 350, 360, labeled SS3, SS1, SS2, SS4, and SS5, respectively. Each device may have one or more antennas, such as the base station antenna(s) 315. The base station may communicate with each SS, including the wireless transmission of polls to each SS. These polls may give each SS the opportunity to transmit data to the BS, if the SS has such data to transmit. Whether the SS responds to each poll by indicating it does or does not have data to transmit is the subject of the previous descriptions.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising a base station to:
   transmit a plurality of polls to a subscriber station in a wireless network at a first time interval Tmin between polls;
   determine whether the station has data to transmit responsive to said plurality of polls;
   increase the time interval between subsequent polls to the subscriber station responsive to determining that the subscriber station does not have data to transmit in response to said plurality of polls until the time interval reaches a second time interval Tmax; and
   dynamically adjust Tmin and Tmax based on network traffic.

2. The apparatus of claim 1, wherein the time interval is to increase exponentially if no reply is received for subsequent consecutive polls.

3. The apparatus of claim 1, wherein the time interval is to increase exponentially based on powers of two if no reply is received for subsequent consecutive polls.

4. The apparatus of claim 1, wherein the time interval is to stop increasing when either:
   1) the time interval reaches a second particular predetermined time interval, or
   2) the time interval is increased a particular number of consecutive times.

5. The apparatus of claim 1, wherein the time intervals are to return to the first predetermined time intervals, responsive to receiving a reply indicating the subscriber station has data to transmit.

6. The apparatus of claim 1, wherein the base station further comprises multiple antennas.

7. A method, comprising:
   transmitting multiple polls to a subscriber station in a wireless network at a first time interval Tmin;
   receiving a wireless reply from the subscriber station to each poll if the subscriber station has data to transmit;
   receiving no reply from the subscriber station to each poll if the subscriber station has no data to transmit;
   determining whether the subscriber station does not have data to transmit in response to said multiple polls;
   increasing the time interval between each consecutive poll to the subscriber station in response to determining if the subscriber station does not have data to transmit in response to said multiple polls until the time interval reaches a second time interval Tmax; and
   dynamically adjusting Tmin and Tmax based on network traffic.

8. The method of claim 7, wherein the time interval increases exponentially if no reply is received for subsequent consecutive polls.

9. The method of claim 8, wherein the time interval increases exponentially based on powers of two if no reply is received for subsequent consecutive polls.

10. The method of claim 7, wherein the time interval stops increasing when the time interval reaches a second particular predetermined time interval.

11. The method of claim 7, wherein the time intervals return to the first predetermined time interval responsive to receiving a reply indicating the subscriber station has data to transmit.

12. The method of claim 7, wherein the particular number of consecutive polls is one poll.

13. The method of claim 7, wherein the particular number of consecutive polls is at least two consecutive polls.

14. An article comprising:
   a tangible machine-readable non-transitory storage medium that contains instructions, which when executed by one or more processors result in performing operations comprising:
   transmitting multiple polls to a subscriber station in a wireless network at a first time interval Tmin;
   receiving a wireless reply from the subscriber station to each poll if the subscriber station has data to transmit;
   receiving no wireless reply from the subscriber station to each poll if the subscriber station has no data to transmit;
   determining whether the subscriber station does not have data to transmit in response to said multiple polls;
   increasing the time interval between each consecutive poll to the subscriber station in response to determining if the subscriber station does not have data to transmit in response to said multiple polls until the time interval reaches a second time interval Tmax; and
   dynamically adjusting Tmin and Tmax based on network traffic.

15. The article of claim 14, wherein the time interval increases exponentially if no reply is received for subsequent consecutive polls.

16. The article of claim 14, wherein the time interval stops increasing when the time interval reaches a second particular predetermined time interval, the second predetermined time interval larger than the first predetermined time interval.

17. The article of claim 14, wherein the time intervals return to the first predetermined time intervals responsive to the reply indicating the subscriber station has data to transmit.

* * * * *